(12) United States Patent
Ishii

(10) Patent No.: US 7,476,064 B2
(45) Date of Patent: Jan. 13, 2009

(54) CUTTING TOOL AND METHOD OF CUTTING WORKPIECE

(75) Inventor: Hiroki Ishii, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 118 days.

(21) Appl. No.: 11/790,598

(22) Filed: Apr. 26, 2007

(65) Prior Publication Data

US 2007/0253787 A1 Nov. 1, 2007

(30) Foreign Application Priority Data

Apr. 27, 2006 (JP) .............................. 2006-123142

(51) Int. Cl.
*B23B 27/14* (2006.01)
*B23C 5/20* (2006.01)

(52) U.S. Cl. ...................... 407/119; 407/118; 407/113

(58) Field of Classification Search ......... 407/113–116, 407/103, 107, 118, 119; 51/307; 428/216, 428/698

See application file for complete search history.

(56) References Cited

U.S. PATENT DOCUMENTS

| | | | | |
|---|---|---|---|---|
| 4,966,501 A | * | 10/1990 | Nomura et al. ............. | 407/119 |
| 5,597,272 A | * | 1/1997 | Moriguchi et al. .......... | 407/119 |
| 5,771,763 A | * | 6/1998 | Naslund et al. .............. | 82/1.11 |
| 5,885,690 A | * | 3/1999 | Sada ........................... | 428/141 |
| 5,983,980 A | * | 11/1999 | Freeman et al. ............. | 164/480 |
| 5,989,680 A | * | 11/1999 | Wakana et al. .............. | 428/141 |
| 6,076,248 A | * | 6/2000 | Hoopman et al. .......... | 29/527.1 |
| 6,082,936 A | * | 7/2000 | Moriguchi et al. .......... | 407/119 |
| 7,090,914 B2 | * | 8/2006 | Yamagata et al. ........... | 428/216 |

FOREIGN PATENT DOCUMENTS

| | | |
|---|---|---|
| JP | 07-157862 | 6/1995 |
| JP | 09-082765 | 3/1997 |
| JP | 2002-146515 | 5/2002 |
| WO | WO 02/04156 A1 | 1/2002 |

* cited by examiner

*Primary Examiner*—Willmon Fridie
(74) *Attorney, Agent, or Firm*—Morrison & Foerster LLP

(57) ABSTRACT

A cutting tool includes a body, a rake face, a flank face, a cutting edge and a region A. The body includes a base and a layer provided on a surface of the base. The rake face is located on a top surface of the body. The flank face is located on a side surface of the body. The cutting edge is located at an intersection of the rake face and the flank face. The region A is a region in the rake face near the cutting edge. A maximum height of the roughness profile $Rz(A)$ of the region A is 0.5–1.0 µm. A skewness $Rsk(A)$ of the region A has a negative value.

20 Claims, 5 Drawing Sheets

SKEWNESS(Rsk) > 0

SURFACE PROFILE

AMPLITUDE DISTRIBUTION CURVE
(PROBABILITY DENSITY FUNCTION)

SKEWNESS(Rsk) < 0

SURFACE PROFILE

AMPLITUDE DISTRIBUTION CURVE
(PROBABILITY DENSITY FUNCTION)

CUTTING TOOL AND METHOD OF CUTTING WORKPIECE

CROSS-REFERENCE TO RELATED APPLICATIONS

The present application claims priority under 35 U.S.C. §119 to Japanese Patent Application No. 2006-123142, filed Apr. 27, 2006. The contents of the application are incorporated herein by reference in its entirety.

BACKGROUND OF THE INVENTION

1. Field of the Invention

This invention relates to a cutting tool with a base coated with a layer.

2. Description of the Related Art

Cutting tools widely used for cutting metals are often made of a base of cemented carbide, cermet, ceramics or the like, with its surface coated with a single layer or a plurality of layers of titanium carbide (TiC), titanium nitride (TiN), titanium carbonitride (TiCN), titanium aluminum nitride (TiAlN) or the like.

Surface roughness of such a cutting tool controls friction with a workpiece and cooling effect of a cutting fluid, and exerts an influence on the cutting. In some cases where the surface roughness is significantly high, a cutting edge of the cutting tool becomes so hot in continuous cutting that the workpiece adheres to the cutting edge to reduce wear resistance of the cutting tool significantly. In cutting such as interrupted cutting that exerts a high impact on the cutting edge, the effect of the impact varies microscopically depending on distribution of uneven spots on the surface of the cutting edge. As a result, cracks are caused in a region of the uneven spots where a great deal of stress converges. The cracks induce chipping which causes a problem of significant reduction in fracture resistance.

WO02-004156 discloses that the surface roughness (Rmax) of a tip of a cutting edge is reduced to equal to or less than 0.2 μm by mechanical processing such as polishing using a brush or lapping. It discloses that the adhesion and microchipping due to the surface roughness can be prevented by the processing to extend the tool life.

By reducing the surface roughness of the tip of the cutting edge, however, it is not avoidable that the cutting edge is heated to a high temperature in high speed cutting or in cutting a workpiece of low heat conductivity such as stainless steel. The cutting edge heated to the high temperature is reduced in the wear resistance and is prone to the adhesion of the workpiece. There has been a problem that achieving a long tool life of the cutting tool is not easy because the reduction in the wear resistance and the adhesion of the workpiece induce a sudden fracture and an abnormal wear of the cutting edge.

On the other hand, the high speed cutting has been brought into use, as a high degree of efficiency is required to the cutting in recent years. There is performed cutting in which a cutting fluid is used to cool the workpiece. Even with the cutting fluid, however, the cutting edge becomes very hot and becomes to prone to the reduction in the wear resistance and to causing the adhesion to the cutting edge. There has been a problem that the reduction in the wear resistance and the adhesion induce the fracture and the abnormal wear of the cutting edge, which result in a short tool life.

Retentivity of the cutting fluid is important in the high speed cutting. Examples are disclosed in Japanese Patent Application Publication Nos. H7-157862 and 2002-146515. That is, when a layer is formed on a surface of a base by an arc ion plating method, droplets (coarse particles) protruding from the surface of the layer are also formed. Mechanical processing such as barrel processing and honing processing is performed to remove top portions of the droplets protruding from the surface. By the processing, however, whole droplets including portions buried in the layer are removed together with the top portions in a way that the droplets are wholly pulled out from the layer. As a result, concave portions (fine holes) are formed on the surface of the layer. The fine holes serve as storage for the cutting fluid to increase the retentivity of the cutting fluid. As a result, lubrication in the cutting is enhanced to improve the wear resistance.

In the case where the size of the fine holes is large, however, cracks are apt to be caused from edges of the fine holes to reduce the fracture resistance.

SUMMARY OF THE INVENTION

A cutting tool according to an embodiment of this invention includes a body, a rake face, a flank face, a cutting edge and a region A. The body includes a base and a layer provided on a surface of the base. The rake face is located on a top surface of the body. The flank face is located on a side surface of the body. The cutting edge is located at an intersection of the rake face and the flank face. The region A is a region in the rake face near the cutting edge. A maximum height of the roughness profile Rz(A) of the region A is 0.5-1.0 μm. A skewness Rsk(A) of the region A has a negative value.

A method of cutting a workpiece according to an embodiment of this invention includes a process to bring the cutting tool described above close to the workpiece, a process to cut the workpiece and a process to separate the cutting tool from the workpiece. In the process to bring the cutting tool close to the workpiece, at least one of the cutting tool and the workpiece is put in rotation. In the process to cut the workpiece, the cutting edge of the cutting tool is brought into contact with a surface of the workpiece.

DETAILED DESCRIPTION OF THE PREFERRED EMBODIMENTS

Figure 1A:
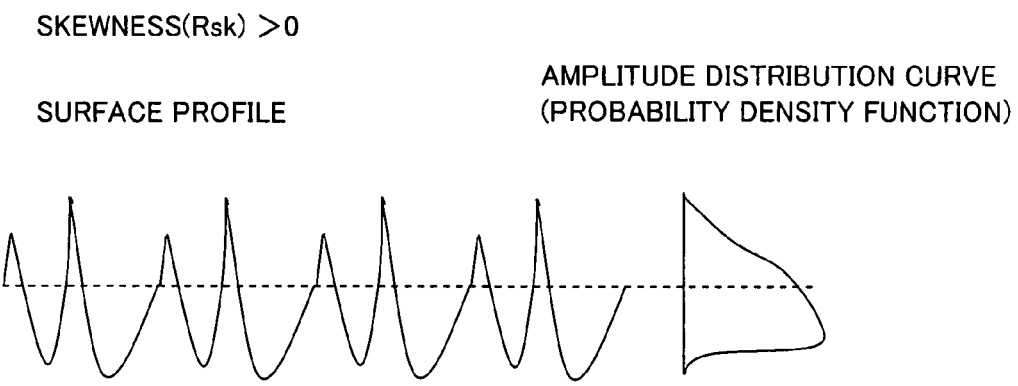
FIG. 1A shows a surface roughness profile and its amplitude distribution curve (probability density function) when a skewness Rsk is positive.

A cutting tool according to an embodiment of this invention will be described referring to the drawings.

Figure 2:
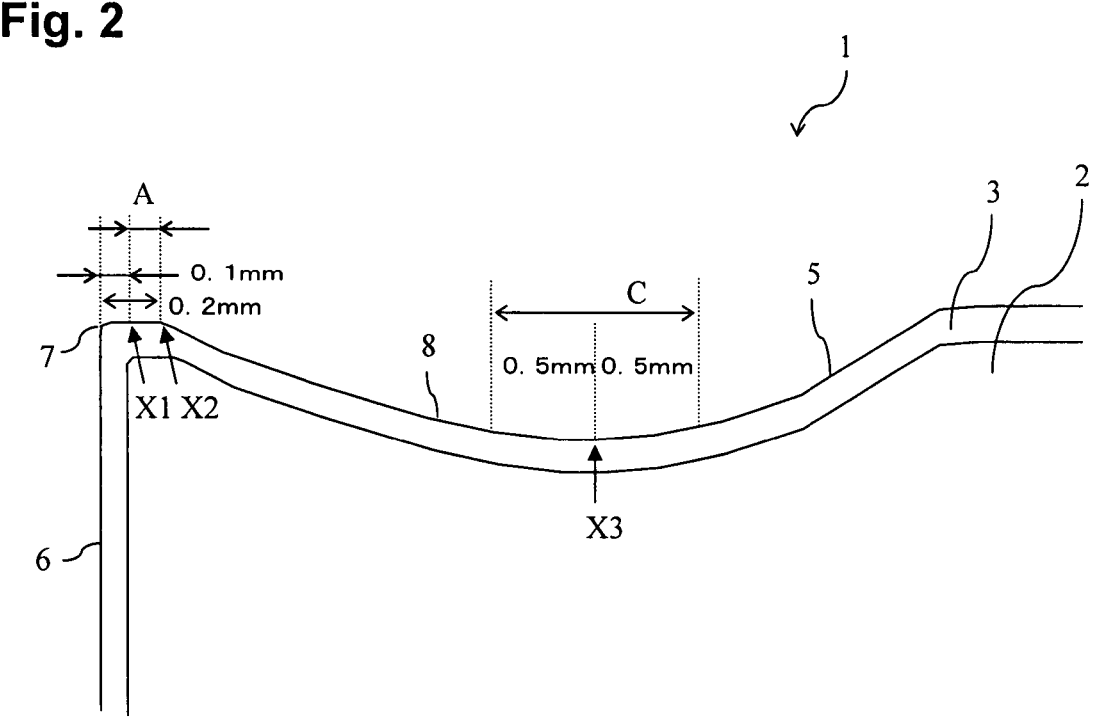
FIG. 2 is a schematic drawing showing a cross-section of a cutting edge of a cutting tool according to an embodiment of this invention.

According to FIG. 2, the cutting tool 1 is made of a base 2 and a layer 3 formed on a surface of the base 2. The layer 3 is made of a single layer or a plurality of layers. That is, the cutting tool 1 is made of a body that is provided with the base 2 and the layer 3 formed on the surface of the base 2. The cutting tool 1 has a rake face 5 formed on a top surface of the body, a flank face 6 formed on a side surface of the body and a cutting edge 7 formed at an intersection of the rake face 5 and the flank face 6. In the embodiment of this invention, as shown in FIG. 2, regions A, B and C are defined as described below, according to a distance from the cutting edge 7 that is at the intersection of the rake face 5 and the flank face 6.

That is, a region in the rake face 5 near the cutting edge 7 is defined as the region A, and a region of the cutting edge 7 on a side of the rake face 5 is defined as the region B. When there is a breaker groove 8 on an inner side of the region A, a bottom region located at a deepest portion of the breaker groove 8 is defined as the region C.

The region A that is the region in the rake face 5 near the cutting edge 7 is a region that is prone to diffusion wear because chips of the workpiece pass through it scraping a surface of the cutting tool 1 heavily. Therefore, the region A is required to have concave portions on its surface, which are of a size capable of storing appropriate amount of cutting fluid, and to exert maximum effects of lubrication and cooling. In the cutting tool according to the embodiment of this invention, by controlling a skewness Rsk(A) of the region A to have a negative value, a maximum height of the roughness profile Rz(A) of the region A is 0.5-1.0 μm, and the adhesion of the workpiece can be reduced because most of the surface is relatively flat. Also, generation of heat due to friction is suppressed to improve the wear resistance, because the cutting fluid infiltrates into the concave portions on the surface of the layer 3 to secure appropriate lubrication.

The region A is a region near the cutting edge and prone to progress of crater wear, and varies depending on a way of cutting. To describe concretely, the region A is a region in the rake face 5 located inner side of the cutting edge 7 by a width of 5-30% of a depth of cut in the cutting, more specifically, by a width of 0.5-3% of a diameter of a incircle of the cutting tool 1. For example, when the diameter of the incircle is 12 mm, the region A is a region between a location X1 that is, for example, 100 μm apart from the cutting edge 7 at the intersection of the rake face 5 and the flank face 6 toward the rake face 5 and a location X2 that is 200 μm apart from the cutting edge 7 toward the rake face 5.

Figure 3:
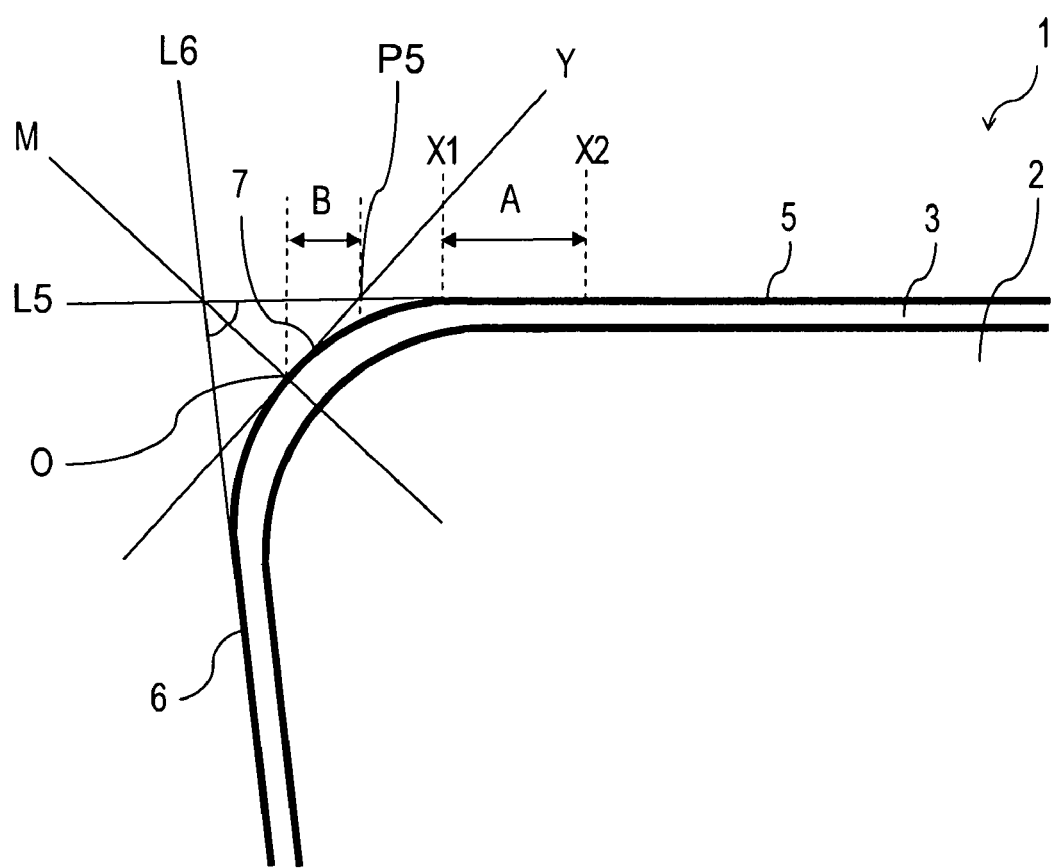
FIG. 3 is a drawing for explanation of regions A and B.

In the case where the cutting edge 7 has been subject to round honing, the region A can be defined as described below. That is, the region A can be defined as a region of a width of 100 μm extending from an intersection of the cutting edge 7 and the rake face 5 toward the rake face 5, as shown in FIG. 3. To describe more specifically, an intersection of the cutting edge 7 and a bisector M of an angle formed by an imaginary extension L5 of a flat portion of the rake face 5 continuous with the cutting edge 7 and an imaginary extension L6 of a flat portion of the flank face 6 continuous with the cutting edge 7 is referred to as a reference location O, for example. A location that is 100 μm apart from the reference location O toward the rake face 5 is referred to as the location X1 and a location that is 200 μm apart from the reference location O toward the rake face 5 is referred to as the location X2. A region between the location X1 and the location X2 can be defined as the region A. Also in the case where the cutting edge 7 has been subject to chamfer honing, the region A can be defined similarly.

Figure 1B:
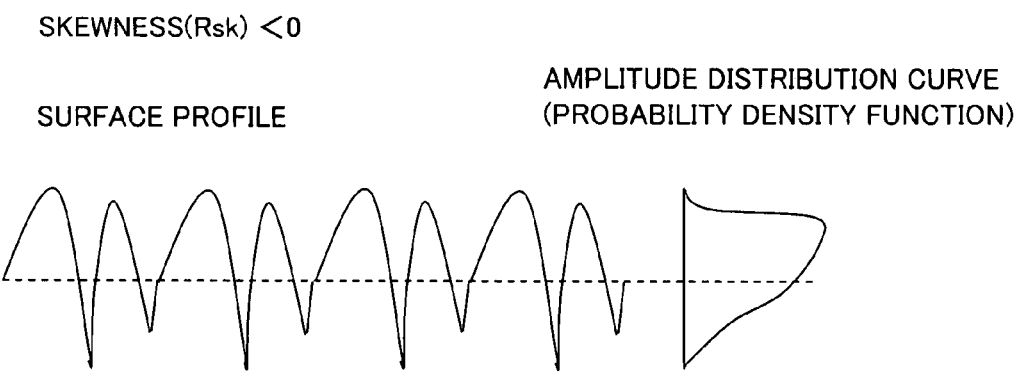
FIG. 1B shows a surface roughness profile and its amplitude distribution curve (probability density function) when the skewness Rsk is negative.

The skewness Rsk represents relativity of an amplitude distribution curve against a mean line of a surface roughness profile, as defined in JIS B 0601-2001 as well as in ISO1302-2002. FIGS. 1A and 1B show the surface roughness profiles and the amplitude distribution curves. Here, the amplitude distribution curve (probability density function) is drawn by plotting a ratio of the number of data n existing between an adjacent pair of lines out of a plurality of parallel lines that equally divide a distance between a peak value and a bottom value of a measured curve representing the surface roughness profile to a total number of data N, taking the ratio of n to N as a horizontal axis and a height of the measured curve as a vertical axis. The skewness Rsk is positive when the amplitude distribution curve is below the mean line of the surface roughness profile as shown in FIG. 1A. On the contrary, the skewness Rsk is negative when the amplitude distribution curve is above the mean line of the surface roughness profile as shown in FIG. 1B.

That the skewness Rsk is positive means that a volume (area in FIGS. 1A and 1B) above the mean line is narrow and that the surface of the layer 3 has a shape including a large number of spikes protruding from the surface. On the other hand, that the skewness Rsk is negative means that the volume (area in FIGS. 1A and 1B) above the mean line is wide and that the surface of the layer 3 has a shape having large area of the layer 3 contacting the workpiece and the chips.

When the skewness Rsk is close to zero, although a coefficient of friction is small, the wear resistance is reduced because a ratio of the area of the layer 3 contacting with the workpiece or the chips is not suitable, that is, because the area contacting the workpiece or the chips increases. Thus, convex portions on the surface of the layer 3 wear out quickly and the lubrication is reduced because of lack of an area of the concave portions that serve as the storage for the cutting fluid.

The base 2 after sintering has a rough surface. A cutting tool 1 in which the layer 3 is formed on the rough surface of the base 2 includes the convex portions on its surface, and the skewness Rsk becomes positive. As a result, adhesion resistance of the surface of the layer 3 is reduced and the diffusion wear and adhesion wear proceed to reduce the wear resistance.

On the other hand, when polishing the surface of the base 2 by brushing, both the surface roughness and the skewness Rsk of the surface of the base 2 become close to zero. Although the surface roughness becomes close to zero reflecting smoothness of the surface of the base 2, the skewness Rsk becomes positive on the surface of the layer 3 formed on the surface of the base 2. When the surface of the layer 3 is polished again to make the skewness Rsk of the surface of the layer 3, the surface roughness on the surface of the layer 3 becomes too small. As a result, the cutting fluid can not be retained enough on the surface of the cutting tool 1 to obtain enough cooling and lubricating effects, thus the wear resistance is reduced.

Therefore, in the cutting tool 1 according to an embodiment of this invention, the surface of the base 2 after sintering and the surface of the layer 3 are appropriately finished. While a surface of an arc ion plating film is polished, there are craters left as traces of the droplets in the cutting tools disclosed in Japanese Patent Application Publication Nos. H07-157862 and 2002-146515. Rz becomes very large so that it is equal to or larger than 2 μm, and so does an absolute value of Rsk accordingly. The cutting tool 1 according to the embodiment of this invention, on the other hand, has an appropriate surface roughness (maximum height of the roughness profile Rz) and skewness Rsk by processing the surface of the base 2 after sintering and the surface of the layer 3 appropriately. As a result, generation of micro cracks is suppressed and the cutting tool 1 is provided with high fracture resistance. Rz of the conventional arc ion plating film, in which there are caused large droplets, becomes about 10 μm and the fracture resistance becomes very low in some cases. In the cutting tool 1 according to the embodiment of this invention, on the other hand, the fracture resistance can be improved because Rz and Rsk are controlled to make a surface texture suitable.

That is, by making the maximum height of the roughness profile Rz(A) of the region A equal to or larger than 0.5 μm, the reduction of the wear resistance due to the lack of the effective lubrication and cooling because the concave portions that can store the cutting fluid are made smaller can be suppressed. And by making the maximum height of the roughness profile Rz(A) of the region A equal to or less than 1.0 μm, it is made possible to suppress the reduction in the wear resistance that would be caused by reduced flow of the chips due to a too large difference between the convex portions and concave portions and resultant increase in the cutting resistance. Also, by making the skewness Rsk(A) of the region A negative, the surface texture of the layer 3 can be made to have large area to contact the workpiece or the chips. Therefore, reduction in lubrication of the chips due to let the convex portions on the surface of the layer 3 wear out early, can be suppressed while cracks caused by the impact to the convex portions during cutting are reduced. As a result, the fracture resistance can be improved.

Furthermore, by making the skewness Rsk(A) in the region A equal to or larger than −0.5, it is made possible to suppress the reduction in the fracture resistance due to cracks caused by the impact during the cutting because the concave portions are too deep. On the other hand, by making the skewness Rsk(A) in the region A equal to or less than −0.1, it is made possible to suppress progress of the wear that would be caused by reduced size of the concave portions capable of storing the cutting fluid and resultant reduction in the lubrication and cooling. As a result, the reductions in the fracture resistance and in the wear resistance is controlled effectively.

According to another embodiment of this invention, controlling the surface roughness is also required together with controlling the skewness Rsk(A) as described above. By making the maximum height of the roughness profile Rz(A) in at least a certain region of the rake face 5 equal to or larger than 0.5 μm, it is made possible to have the ability to retain the cutting fluid to secure enough amount of the cutting fluid provided between the workpiece and the surface of the cutting tool 1, and thereby suppress the reduction in the wear resistance of the layer 3, which would be caused when the contact portion would be heated to a high temperature. Also, by making the maximum height of the roughness profile Rz(A) in the certain region equal to or less than 1.0 μm, it is made possible to suppress tendency to cause the adhesion due to the convex portions and concave portions on the surface as well as to suppress tendency to cause chipping and cracking that would lead to reduction in the fracture resistance.

Next, the region B described above, which is a region in the cutting edge 7 on a side of the rake face 5, will be explained. The region B is a region in a tip of the cutting edge, on which a large cutting load due to the cutting is imposed. Similar to the region A, the chips of the workpiece pass over the region B and certain amount of lubrication is required. However, a larger cutting load is imposed on the region B than on the region A.

The region B is preferably structured so that a maximum height of the roughness profile Rz(B) in the region B is 0.1 μm-1.5 μm and a skewness Rsk(B) in the region B is negative and larger than Rsk(A). With the structure described above, the region B is made to have a surface texture that is highly effective in reducing occurrence of chipping and adhesion, thereby making it possible to reduce the abnormal wear. A cutting tool 1 that is excellent in the fracture resistance and the wear resistance can be realized as a result of optimization of balance between the fracture resistance of the cutting edge and the wear resistance of the rake face 5.

Rsk(B) is more preferably −0.2 to 0. In this case, occurrence of cracks due to the impact can be reduced to improve the fracture resistance.

It is preferable that Rz(A) is larger than Rz(B). In this case, the region A has excellent lubrication while the region B has excellent fracture resistance, thereby improving the tool life of the cutting tool 1 as a whole.

In addition, it is made possible to suppress reduction in cutting accuracy due to the chipping, since the fracture resistance of the region B is further enhanced by that Rz(B) is 0.1 μm -0.5 μm. That is, the fracture resistance can be enhanced by lowering cutting temperature as well as reducing deep concave portions that cause fracturing.

It is particularly preferable that Rz(B) is 0.1 μm-0.5 μm and Rsk(B) is −0.2 to 0. As a result, it is made possible that the cutting edge is prevented from being heated to a high temperature and that the diffusion wear due to cutting heat and abnormal wear such as the adhesion wear and the chipping are reduced. Therefore, high wear resistance and fracture resistance can be maintained.

The region B is more specifically a region in the cutting edge 7 from the intersection with the flank face 6 toward the rake face 5.

Similar to the region A described above, in the case where the cutting edge 7 has been subject to the round honing, the region B can be defined as a portion that has been subject to the cutting edge processing (a portion that has been subject to the honing). To describe concretely, referring an intersection of a tangent Y to the cutting edge 7 at the reference location O and the imaginary extension L5 of the rake face 5 to as P5, the region B is defined as a region from the reference location O to an intersection of the cutting edge 7 and a straight line intersecting perpendicular to the imaginary extension L5 at P5, as shown in FIG. 3. The reference location O is the intersection of the cutting edge 7 and the bisector M of the angle formed by the imaginary extension L5 of the flat portion of the rake face 5 continuous with the cutting edge 7 and the imaginary extension L6 of the flat portion of the flank face 6 continuous with the cutting edge 7.

In the case where the cutting tool 1 has a breaker groove 8 inside of the region A of the rake face 5, the lubrication is required more than impact resistance because the breaker groove 8 is not subject to a strong impact but is subject to a constant flow of chips. In other words, it is required that the lubrication of the breaker groove 8 is enhanced to make the flow of the chips smooth. Referring a bottom region located at a deepest portion of the breaker groove 8 as to a region C, it is desirable that a maximum height of the roughness profile Rz(C) of the region C is 0.1 μm-1.5 μm and a skewness Rsk(C) of the region C is smaller than Rsk(A), in the cutting tool 1 according to the embodiment of this invention. In this case, the craterwear is reduced while the lubrication is enhanced. That is, the region C exerts excellent lubrication since the region C acquires more region of the concave portion. Because the chips thereby flow smoothly over the region C, heat generation due to friction between the chips and the region C can be reduced. As a result, deterioration of material of the cutting tool 1 and the workpiece due to frictional heat can be reduced.

It is desirable that Rsk(C) is −1.0 to −0.4. In this case, the lubrication is further enhanced. Cutting performance can be thereby improved in wet cutting.

It is especially desirable that Rz(C) is 0.5 μm-1.5 μm. In this case, Rsk(C) can be easily controlled within the range described above and the effect to enhance the lubrication in the region C is increased. In addition, it is desirable that Rz(C) is larger than Rz(A). In this case, both the region A with the excellent wear resistance and the region C with the excellent lubrication can be acquired. As a result, the effect to improve the tool life is enhanced.

It is desirable that the maximum height of the roughness profile Rz(C) is 0.5 μm-1.5 μm and the skewness Rsk(C) is −1.0 to −0.4 in the region C. In this case, the craterwear resistance can be improved while the high lubrication in the breaker groove 8 is maintained.

The region C is the bottom region located at the deepest portion of the breaker groove 8 as described above. It means a region in the breaker groove 8 where the chips slide. That is, it is a region where the lubrication is required more than impact resistance because it is not subject to a strong impact but is subject to a constant flow of chips. To describe more specifically, for example, in the case of CNMG120408 type cutting insert, the region C can be defined as a region of a width of 1 mm (a width of 500 μm each in both directions) centered around the deepest portion of the breaker groove 8 approximately, although it varies depending on a shape of the breaker groove 8.

In the case where the deepest portion of the breaker groove 8 is formed on a single plane, unlike the case shown in FIG. 2, the region C can be defined similarly to the case described above, assuming that any point on the plane corresponding to the deepest portion is X3 (the deepest portion) in FIG. 2.

A convex portion is defined as a portion protruding above a reference line that goes through a midpoint between a highest location and a lowest location in a reference length of 5 μm on an interface between the base 2 and the layer 3. It is desirable that a maximum height of the roughness profile Rz(A') in an interface between the base 2 and the layer 3 in the region A is 0.3 μm-1.5 μm and that the number of the convex portions is 4-15. In this case, the surface texture of the layer 3 is easily controlled and adhesion of the layer 3 to the base 2 can be enhanced.

It is preferable that the region B and the region C are also provided with the surface texture described above and have approximately the same number of convex portions as the number of convex portions in the region A described above. In this case, the adhesion of the layer 3 to the base 2 can be enhanced.

The maximum height of the roughness profile Rz(A') in the interface between the base 2 and the layer 3 is defined in an observation of an organization of the layer 3 as a value obtained from a line 9 tracing the shapes of the convex portions and concave portions in the interface between the base 2 and the layer 3 according to a calculation method of the maximum height of the roughness profile Rz defined by JIS B 0601-2001 (ISO4287-1997) when the reference length is assumed to be 5 μm.

Figure 4:
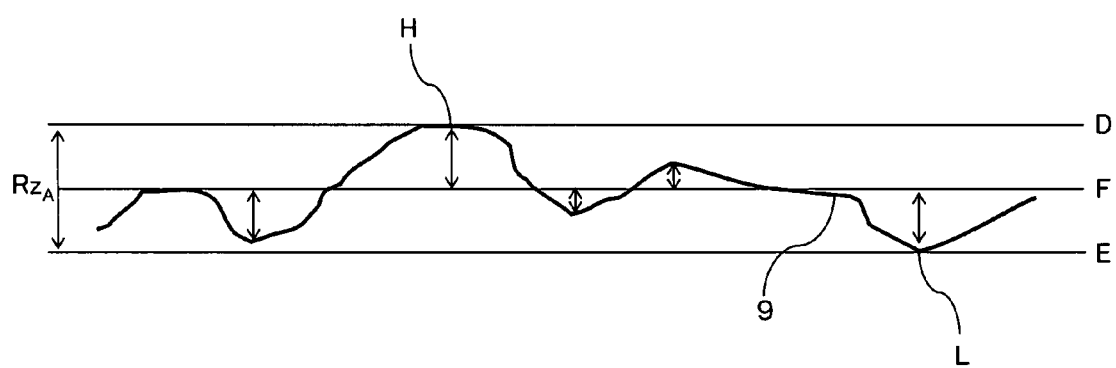
FIG. 4 is a schematic drawing to explain a method of measuring the number of convex portions on an interface between a base and a layer.

The number of convex portions in the reference length of 5 μm can be obtained from the tracing line 9 by a method shown in FIG. 4.

First, a cut surface or a fractured surface of the cutting tool 1 is observed with a scanning electron microscope (SEM) at a magnification of 5000-20000, for example. The shapes of the convex portions and concave portions are traced on a picture obtained. Using the tracing line 9, there is drawn a straight line that is parallel to the base 2 and goes through a midpoint of a shortest distance between a straight line D that is approximately parallel to the base 2 and goes through a top of the highest convex portion in the interface between the base 2 and the layer 3 and a straight line E that is approximately parallel to the base 2 and goes through a bottom of the lowest concave portion in the interface. The straight line drawn as described above is referred to as a reference line F. Out of the tracing line 9, portions above the reference line F are referred to as convex portions and portions below the reference line F are referred to as concave portions. The number of convex portions (two in FIG. 4) is determined by counting the portions above the reference line F (Refer to FIG. 4.).

It is desirable that a contact angle of water on the rake face 5 is 30°-80°. In this case, the cutting fluid infiltrates enough into the concave portions on the rake face 5 to enhance the lubrication. The contact angle of water is measured by static drop method based on JIS R 3257-1999.

The cutting tool 1 with the surface texture of the layer 3 as described above can be manufactured in a structure and by a manufacturing method as described below.

The base 2 is made of cemented carbide, titanium-based cermet or ceramics.

The cemented carbide is tungsten carbide (WC) combined according to a requirement with a hard phase made of one chosen from a group of carbide, nitride and carbonitride of a metal in the fourth, fifth or sixth group in the periodic system through a binder phase made of iron group metal such as cobalt (Co) and/or nickel (Ni). Examples of the ceramics are silicon nitride, aluminum oxide, diamond and cubic boron nitride.

It is desirable that an average particle diameter of primary crystals of the ceramics or the hard phase of the cemented carbide or the titanium-based cermet constituting the base 2 is 1 μm-2 μm. In the case of the cemented carbide or the titanium-based cermet, there may be a layer of a thickness of 10-100 μm having a binder phase concentration different from inside on the surface of the base 2.

A manufacturing method of the cutting tool 1 according to the embodiment will be explained taking a case in which the cemented carbide is used as the base 2 as an example. The cemented carbide is composed of 3-20 weight % of metallic cobalt (Co) powder, 0.1-10 weight % of a compound that can form a hard phase chosen from a group of carbide (except for tungsten carbide), nitride and carbonitride of a metal in the fourth, fifth or sixth group in the periodic system and the rest composed of tungsten carbide (WC) powder. These material powders are mixed together and press-molded into a shape of the cutting tool 1. After the molded body is debindered, it is sintered at a furnace temperature of 1350-1450° C. in vacuum for 0.5-3 hours to form the base 2 made of the cemented carbide.

Then, an entire surface of the base 2 is blasted before forming the layer 3 in order to enhance adhesion between the layer 3 and the base 2 as well as reflecting a surface texture of the base 2 in a surface texture of the layer 3. Alumina abrasive grains of #200-1000 are blasted at a pressure of 2-10 MPa so that a maximum height of the roughness profile Rz of the surface of the base 2 is adjusted to be about 0.3 μm-1.5 μm of uniform roughness. At that time, the cutting edge can be subject to the round honing by blasting against the cutting edge intensively. It is also possible to remove burrs of the cutting edge caused in the sintering.

The cutting edge may be subject to the round honing by brushing before the blasting when it is desired. The cutting edge is turned into a shape well balanced between sharpness and fracture resistance by making a honing width (curvature radius: R) 0.02-0.06 mm. In some cases that will be described later, after the surface of the layer 3 is blasted, only the cutting edge is processed by adjusting a position of the brush so that the brush touches only the cutting edge. In this case also, the maximum height of the roughness profile Rz(A') of the surface of the base 2 in the region A is adjusted to be 0.3 μm-1.5 μm.

Then, the layer 3 is formed on the blasted surface of the base 2 by CVD (chemical vapor deposition) method. The layer 3 may be made of either a single layer or multi layers. An example of a concrete structure of the layer 3 is formed by following procedures.

For example, a TiN layer of a thickness of 0.2-0.5 μm is formed on the surface of the base 2 as a first layer. A TiCN layer made of columnar crystals that excel in the wear resistance and the fracture resistance is formed on the first layer to have a thickness of 1.5-5 μm as a second layer. A TiCN layer made of granular crystals of is formed on the second layer to have a thickness of 0.05-0.2 μm as a third layer, and a TiCNO layer is formed on the third layer to have a thickness of 0-0.2 μm as a fourth layer. An Al2O3 layer that excels in oxidation resistance is formed on the fourth layer as a fifth layer. A TiN layer or a TiC layer is formed on the fifth layer to have a thickness of 0.5-1.5 μm as a sixth layer.

While the layer 3 becomes better in the wear resistance as its thickness increases, the fracture resistance is reduced on the other hand because of a residual stress due to a thermal expansion difference between the base 2 and the layer 3. Therefore, it is necessary to set the thickness of the layer 3 to a value most suitable for the usage of the cutting tool 1 such as the workpiece and cutting conditions. It is desirable that the total thickness of the layer 3 is equal to or less than 15 μm so that the surface texture of the base 2 is reflected in the surface texture of the layer 3.

An example of conditions under which the layer 3 is formed is described hereafter. A reaction gas is introduced into a CVD furnace controlled at a furnace temperature of 800-1100° C. and a furnace pressure of 5-85 kPa in order to form the first layer that is the titanium nitride (TiN) layer. The reaction gas is a mixture of 0.1-10 volume % of titanium chloride (TiCl4) gas, 5-60 volume % of nitrogen (N2) gas and the rest composed of hydrogen (H2) gas.

A reaction gas is introduced into the CVD furnace controlled at a furnace temperature of 750-900° C. and a furnace pressure of 5-85 kPa in order to form the second layer that is the titanium carbonitride (TiCN) layer. The reaction gas is a mixture of 0.1-10 volume % of titanium chloride (TiCl4) gas, 0-40 volume % of nitrogen (N2) gas, 1-10 volume % of acetonitrile (CH3CN) gas and the rest composed of hydrogen (H2) gas.

A reaction gas is introduced into the CVD furnace controlled at a furnace temperature of 950-1100° C. and a furnace pressure of 5-85 kPa in order to form the third layer that is the granular layer of titanium carbonitride (TiCN). The reaction gas is a mixture of 3-10 volume % of titanium chloride (TiCl4) gas, 5-40 volume % of nitrogen (N2) gas, 1-15 volume % of methane (CH4) gas and the rest composed of hydrogen (H2) gas.

A reaction gas is introduced into the CVD furnace controlled at a furnace temperature of 800-1100° C. and a furnace pressure of 5-30 kPa in order to form the fourth layer that is the TiCNO layer. The reaction gas is a mixture of 0.1-3 volume % of titanium chloride (TiCl4) gas, 0.1-10 volume % of methane (CH4) gas, 0.01-5 volume % of carbon dioxide (CO2) gas, 5-60 volume % of nitrogen (N2) gas and the rest composed of hydrogen (H2) gas.

A reaction gas is introduced into the CVD furnace controlled at a furnace temperature of 900-1100° C. and a furnace pressure of 5-10 kPa in order to form the fifth layer that is the Al2O3 layer. The reaction gas is a mixture of 3-20 volume % of aluminum chloride (AlCl3) gas, 0.5-3.5 volume % of hydrogen chloride (HCl) gas, 0.01-5 volume % of carbon dioxide (CO2) gas, 0-0.01 volume % of hydrogen sulfide (H2S) gas and the rest composed of hydrogen (H2) gas.

A reaction gas is introduced into the CVD furnace controlled at a furnace temperature of 800-1100° C. and a furnace pressure of 5-85 kPa in order to form the sixth layer that is the titanium nitride (TiN) layer or the titanium carbide (TiC) layer. The reaction gas in the case to form the titanium nitride (TiN) layer is a mixture of 0.1-10 volume % of titanium chloride (TiCl4) gas, 5-60 volume % of nitrogen (N2) gas and the rest composed of hydrogen (H2) gas. The reaction gas in the case to form the titanium carbide (TiC) layer is a mixture of 0.1-10 volume % of titanium chloride (TiCl4) gas, 5-60 volume % of methane (CH3) gas and the rest composed of hydrogen (H2) gas.

After the layer 3 is formed, brushing is applied to its surface. Diamond abrasive grains of #1000 and above, SiC abrasive grains of #300 and above or alumina abrasive grains of #300 and above are used as abrasive grains, for example. A relatively soft brush made of hog bristle or nylon with brush length of 100 mm and above is preferable. Brushing time is adjusted within a range between 20 seconds and 100 seconds in order not to remove too much of the surface of the layer 3 that reflects the surface texture of the base 2. With this, the surface of the layer 3 can be processed to the most suitable surface texture. After the surface of the layer 3 is brushed, it is possible that only the cutting edge is processed by adjusting the position of the brush so that the brush touches only the cutting edge.

Figure 5A:
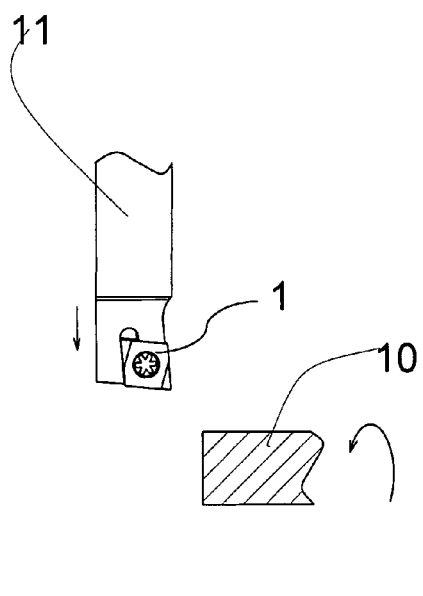
FIGS. 5A, 5B and 5C show processes in a method of cutting according to an embodiment of this invention.
Figure 5B:
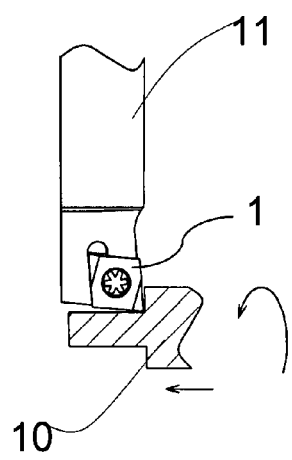
Figure 5C:
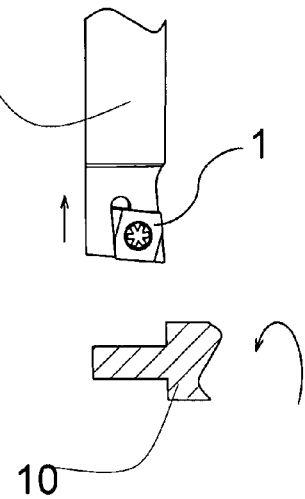

Finally, a method of cutting a workpiece according to an embodiment of this invention is explained taking a turning tool as an example, referring to FIGS. 5A, 5B and 5C.

The cutting tool 1 is attached to a cutting tool holder 11. Then a cutting edge of the cutting tool 1 is brought close to a workpiece 10, as shown in FIG. 5A. It is good enough that the cutting tool 1 and the workpiece 10 approach relative to each other. For example, the workpiece 10 may be brought close to the cutting tool 1.

And at least one of the workpiece 10 and the cutting tool 1 is rotated. FIGS. 5A, 5B and 5C show the case in which the workpiece 10 is rotated, for example. Then the cutting edge of the cutting tool 1 comes into contact with the workpiece 10 to cut it, as shown in FIG. 5B. After that, the cutting tool 1 is separated from the workpiece 10, as shown in FIG. 5C. In the case of continuous cutting, the cutting tool 1 is repeatedly brought into contact with other locations of the workpiece 10 while one of them keeps rotating against the other.

A processed workpiece with improved work surface accuracy can be obtained because the workpiece 10 is cut with the cutting tool 1 that is improved in the fracture resistance and the retentivity of the cutting fluid as described above. Particularly in wet cutting, further improvement in the work surface accuracy can be facilitated because the cutting tool 1 improved in infiltration of the cutting fluid is used. Also, because chip ejection performance of the cutting tool 1 is improved, chip jamming can be reduced to keep stable cutting for extended period of time. As a result, efficiency of cutting can be facilitated. In particular, the cutting tool 1 according to the embodiment of this invention can exert the effect described above in cutting stainless steel which is high in ductility and low in thermal conductivity.

In other words, the occurrence of adhesion is suppressed in turning of the workpiece such as stainless steel that is prone to adhesion to the cutting edge in the cutting. Thus it is made possible to improve accuracy of the finished surface.

DESCRIPTION OF THE PREFERRED EMBODIMENT

Tungsten carbide (WC) powder of average grain diameter of 1.5 μm mixed with 6 weight % of metallic cobalt (Co) of average grain diameter of 1.5 μm, 0.5 weight % of titanium carbide (TiC) powder of average grain diameter of 1.5 μm and 1 weight % of tantalum carbide (TaC) powder was press-molded into a shape of a cutting tool (CNMA120412), debindered and then sintered in vacuum of 0.01 Pa at 1500° C. for 1 hour to manufacture the cemented carbide.

Further, surface treatment and cutting edge processing were applied to the manufactured cemented carbide with processing methods shown in Table 2.

When the surface treatment was implemented by blasting, wet blasting at a pressure of 2 MPa using alumina abrasive grains of #500 was applied to the entire surface of the cutting tool. Honing was applied to some samples by brushing using SiC abrasive grains of #500 at a brush rotation speed of 400 rpm. At that time, in order not to remove the blasted surface, a position of the brush was adjusted so that the brush touched only the cutting edge.

Next, samples of No. 1-8 and 10-20 was manufactured as follows. The layers were formed on the base of the cemented carbide described above by the CVD method under conditions shown in Table 1, in the order from the TiN layer (0.4 μm thick), the TiCN layer (2.5 μm thick), the TiCN layer (0.1 μm thick), the TiCNO layer (0.1 μm thick), the Al2O3 layer (0.5 μm thick) to the TiN layer (0.7 μm thick). On the other hand, a sample No. 9 (reference) was manufactured by forming a TiAlN layer of a thickness of 3.0 μm on the cemented carbide described above by the arc ion plating method.

TABLE 1

| LAYERS | | COMPOSITION OF REACTION GAS (VOLUME %) | TEMPERATURE (?C.) | PRESSURE (kPa) |
|---|---|---|---|---|
| 1ST LAYER | $TiN_1$ | $TiCl_4$: 2.0, $N_2$: 30, $H_2$: REST | 865 | 16 |
| 2ND LAYER | $TiCN_1$ | $TiCl_4$: 1.7, $N_2$: 43, $CH_3CN$: 0.5, $H_2$: REST | 865 | 9 |
| 3RD LAYER | $TiCN_2$ | $TiCl_4$: 1.7, $N_2$: 35, $CH_4$: 6, $H_2$: REST | 950 | 15 |
| 4TH LAYER | $TiCNO_1$ | $TiCl_4$: 2.1, $CH_4$: 4.2, $N_2$: 20.8, $CO_2$: 5.2, $H_2$: REST | 1010 | 7 |
| 5TH LAYER | $Al_2O_3$ | $AlCl_3$: 1.6, $CO_2$: 3.7, HCl: 2.1, $H_2$: REST | 1010 | 9 |
| 6TH LAYER | $TiN_2$ | $TiCl_4$: 2.0, $N_2$: 30, $H_2$: REST | 1010 | 16 |

After that, surface treatment shown in Table 2 was performed. At that time, brushing was performed with a brush having a brush length of 120 mm at a brush rotation speed of 100 rpm for 40 seconds, using diamond abrasive grains of #1000. The brushing was performed either using an upright type brush having a horizontal rotation axis so that the brush touched only the cutting edge (represented as CUTTING EDGE in Table 2) or using a transverse type brush having a vertical rotation axis so that the brush touched not only the cutting edge but also the entire rake surface (represented as ENTIRE SURFACE in Table 2).

The rake face of the cutting tool was blasted from a vertical direction with alumina abrasive grains of #300 together with water, which served as a solvent, at a pressure of 2.0 MPa, with 20 mm of distance between the cutting tool and a nozzle that has a nozzle diameter of 10 mm.

with JIS R 3257-1999. Regarding the region A, a value obtained in accordance with JIS B 0601-2001 (ISO4287-1997) assuming that the reference length was 5 µm was calculated as a maximum height of the roughness profile Rz(A') in the interface To describe in detail, the surface roughness of the base was measured by observing the interface between the base and the layer with a scanning electron microscope (SEM) at a magnification of 15000. To describe concretely, there were drawn a straight line D approximately parallel to the base and passing through a highest location H where the base was most protruding in the interface between the base and the layer and a straight line E approximately parallel to the base and passing through a lowest location L where the base was most depressed. There was drawn a reference line F approximately parallel to the base and passing through a

TABLE 2

| SAMPLE | PROCESSING OF BASE | | AFTER CVD | |
|---|---|---|---|---|
| No | POLISHING | HONING | BRUSHING | BLASTING |
| 1 | BLASTING | BRUSHING | WITH (CUTTING EDGE) | WITHOUT |
| 2 | BLASTING | (CUTTING EDGE) | WITH (ENTIRE SURFACE) | WITHOUT |
| 3 | BLASTING | | WITHOUT | WITH |
| 4 | BLASTING (ENTIRE SURFACE) | | WITH (CUTTING EDGE) | WITHOUT |
| 5 | BLASTING | BRUSHING (ENTIRE SURFACE) | WITH (ENTIRE SURFACE) | WITHOUT |
| 6 | WITHOUT | BRUSHING | WITH | WITHOUT |
| 7 | BRUSHING | (CUTTING EDGE) | WITHOUT | WITHOUT |
| 8 | BRUSHING (ENTIRE SURFACE) | | WITH (ENTIRE SURFACE) | WITHOUT |
| 9 | BLASTING | BRUSHING | WITH (ENTIRE SURFACE) | WITHOUT |
| 10 | BLASTING | (CUTTING EDGE) | WITH (CUTTING EDGE) | WITHOUT |
| 11 | BLASTING | | WITH (ENTIRE SURFACE) | WITHOUT |
| 12 | BLASTING | | WITH (ENTIRE SURFACE) | WITHOUT |
| 13 | BLASTING | | WITH (CUTTING EDGE) | WITHOUT |
| 14 | BLASTING | | WITH (CUTTING EDGE) | WITHOUT |
| 15 | BLASTING | | WITH (ENTIRE SURFACE) | WITHOUT |
| 16 | BLASTING | | WITH (CUTTING EDGE) | WITHOUT |
| 17 | BLASTING | | WITH (ENTIRE SURFACE) | WITHOUT |
| 18 | BLASTING | | WITH (ENTIRE SURFACE) | WITHOUT |
| 19 | BLASTING | | WITH (CUTTING EDGE) | WITHOUT |
| 20 | BLASTING | | WITH (ENTIRE SURFACE) | WITHOUT |

The maximum height of the roughness profile Rz and the skewness Rsk of each of the regions A, B and C of each of the manufactured cutting tools were measured in accordance with JIS B 0601-2001 under conditions that were a cut-off value of 0.25 mm, a reference length of 0.8 mm and a scanning speed of 0.1 mm/sec. The measurements were carried out at arbitrary three locations in each of the regions A, B and C, and results are shown in Table 3 as minimum value-maximum value.

Also, a contact angle E of water on a flat portion of the rake face was measured by the static drop method in accordance midpoint of a shortest distance between the straight line D and the straight line E. The shortest distance between the straight line D and the straight line E was calculated at each of five arbitrary locations (within a length of 5 µm in the interface per location). An average of five values obtained was referred to as the maximum height of the roughness profile Rz(A'). Also the number of convex portions protruding above the reference line F was counted at each of the five arbitrary locations and an average value was calculated. Results are shown in Table 3.

Continuous cutting test and interrupted cutting test were carried out using the cutting tools under the conditions shown below to evaluate the wear resistance and the fracture resistance. Results are shown in Table 3.

(Continuous Cutting Test)
workpiece: SUS304
cutting speed: 120 m/minute
feed rate: 0.3 mm/rev
depth of cut: 2 mm
cutting time: 40 minutes
others: water-miscible cutting fluid was used
evaluation item: cutting edge was observed with a microscope and an amount of flank wear was measured (Interrupted Cutting Test)
workpiece: SUS304
cutting speed: 100 m/minute
feed rate: 0.4 mm/rev
depth of cut: 2 mm
others: water-miscible cutting fluid was used
evaluation item: number of impacts to fracture Sample Nos. 3 and 5-9, surface roughness of the layers of which were out of the preferred range according to the embodiment of this invention, showed rapid progress of the rake face wear and caused abnormal wear and fracture due to chipping and film separation, thereby resulting in a short tool life. Since the sample No. 7 had positive value between the minimum value and maximum value of Rsk and there were sharp protruding surface portions in part of the region A where Rsk had positive value, there were caused fractures from the portions to reduce the fracture resistance.

On the other hand, the sample Nos. 1, 2 and 4, surface roughness of the layers of which were placed in the preferred range according to the embodiment of this invention by polishing the surface of the base by blasting and by preferably honing so that the blasted surface was suitably maintained, showed relatively small wear in the rake face of the cutting edge and land, no chipping of the cutting edge and no film separation, thereby exerted excellent wear resistance and fracture resistance. The sample Nos. 10-20, surface roughness of the layers of which were in the preferred range according to the embodiment of this invention, also exerted excellent wear resistance and fracture resistance.

What is claimed is:

1. A cutting tool comprising:
    a body comprising a base and a layer, the layer being formed on a surface of the base;
    a rake face disposed on a top surface of the body;
    a flank face disposed on a side surface of the body;
    a cutting edge disposed at an intersection of the rake face and the flank face; and
    a region A that is a portion of the rake face near the cutting edge, wherein a maximum height of the roughness profile Rz(A) of the region A is in a range between 0.5 µm and 1.0 µm and a skewness Rsk(A) of the region A is negative.

2. The cutting tool of claim 1, wherein the skewness Rsk(A) of the region A is in a range between −0.5 and −0.1.

3. The cutting tool of claim 1, wherein a maximum height of the roughness profile Rz(A') of an interface between the base and the layer in the region A is in a range between 0.3 µm and 1.5 µm and there are four to fifteen convex portions in the interface of a reference length of 5 µm, each of the convex portions being defined as a portion protruding above a reference line that goes through a midpoint between a highest location and a lowest location in the interface of the reference length of 5 µm.

4. The cutting tool of claim 1, wherein a contact angle θ of water on the rake face is in a range between 30 degrees and 80 degrees.

5. The cutting tool of claim 1, further comprising a region B that is a portion of the cutting edge on a side of the rake face, wherein a maximum height of the roughness profile Rz(B) of the region B is in a range between 0.1 µm and 1.5 µm and a skewness Rsk(B) of the region B is negative and larger than the skewness Rsk(A) of the region A.

6. The cutting tool of claim 5, wherein the skewness Rsk(B) of the region B is in a range between −0.2 and 0.

7. The cutting tool of claim 5, wherein the maximum height of the roughness profile Rz(A) of the region A is larger than the maximum height of the roughness profile Rz(B) of the region B.

TABLE 3

| SAMPLE No | REGION A | | REGION B | | REGION C | | INTERFACE | | CONTACT ANGLE (°) | CUTTING TEST | |
|---|---|---|---|---|---|---|---|---|---|---|---|
| | Rz (µm) | Rsk | Rz (µm) | Rsk | Rz (µm) | Rsk | Rz (µm) | NUMBER OF BUMPS | | AMOUNT OF WEAR (mm) | NUMBER OF IMPACTS |
| 1 | 0.54~0.68 | −0.39~−0.35 | 0.2~0.29 | −0.08~−0.05 | 0.71~0.84 | 0.4~0.6 | 0.52 | 8 | 80 | 0.21 | 4200 |
| 2 | 0.58~0.72 | −0.38~−0.36 | 0.15~0.24 | −0.04~−0.02 | 0.62~0.75 | −0.48~−0.33 | 0.48 | 9 | 82 | 0.11 | 4500 |
| 3 | 1.2~1.5 | 0.1~0.18 | 0.75~0.8 | 0.1~0.12 | 0.85~1.21 | 0.43~0.5 | 0.61 | 6 | 27 | 0.47 | 1200 |
| 4 | 0.56~0.77 | −0.41~−0.37 | 0.25~0.31 | −0.09~−0.07 | 0.63~0.77 | −0.83~−0.73 | 0.54 | 7 | 77 | 0.25 | 4000 |
| 5 | 0.33~0.41 | −0.22~−0.18 | 0.21~0.35 | −0.04~−0.06 | 0.22~0.34 | −0.24~−0.13 | 0.72 | 9 | 65 | 0.37 | 3800 |
| 6 | 0.52~0.73 | 0.1~0.12 | 0.7~0.9 | 0.31~0.34 | 0.38~0.48 | 0.22~0.4 | 0.2 | 4 | 80 | 0.41 | 1900 |
| 7 | 0.75~0.88 | −0.05~0.1 | 0.6~0.9 | 0.01~0.04 | 0.31~0.42 | 0.2~0.36 | 0.15 | 3 | 88 | 0.38 | 2000 |
| 8 | 0.37~0.44 | −0.01~0.05 | 0.2~0.29 | 0.01~0.03 | 0.2~0.32 | 0.08~0.13 | 0.25 | 1 | 32 | 0.42 | 2600 |
| 9 | 0.28~0.43 | −0.2~0.18 | 0.1~0.3 | −0.09~−0.05 | 0.34~0.42 | −0.29~−0.21 | 0.46 | 3 | 80 | 0.41 | 4600 |
| 10 | 0.73~0.92 | −0.78~−0.52 | 0.61~0.74 | −0.05~0.12 | 1.53~1.60 | −1.55~−1.27 | 1.68 | 20 | 87 | 0.27 | 4000 |
| 11 | 0.51~0.58 | −0.07~−0.01 | 0.03~0.08 | −0.31~−0.22 | 0.13~0.23 | 0.17~0.30 | 0.23 | 0 | 21 | 0.18 | 4400 |
| 12 | 0.59~0.65 | −0.39~−0.35 | 0.11~0.15 | −0.11~−0.03 | 0.05~0.12 | −0.53~−0.31 | 0.15 | 0 | 19 | 0.23 | 4500 |
| 13 | 0.65~0.80 | −0.38~−0.36 | 0.41~0.49 | −0.28~−0.17 | 0.78~1.23 | −0.07~−0.02 | 1.47 | 15 | 80 | 0.26 | 4200 |
| 14 | 0.68~0.98 | −0.87~−0.59 | 0.67~0.81 | −0.12~−0.08 | 1.34~1.51 | −0.7~−1.01 | 1.59 | 18 | 86 | 0.27 | 4000 |
| 15 | 0.51~0.58 | −0.21~−0.14 | 0.11~0.15 | −0.01~0.07 | 0.12~0.25 | −0.49~−0.58 | 0.35 | 4 | 31 | 0.14 | 4100 |
| 16 | 0.87~0.95 | −0.18~−0.11 | 0.58~0.79 | 0.05~0.12 | 1.28~1.47 | −0.99~−0.72 | 1.63 | 21 | 88 | 0.28 | 4000 |
| 17 | 0.50~0.62 | −0.25~−0.13 | 0.03~0.07 | −0.31~−0.22 | 0.19~0.31 | −0.68~−0.82 | 0.43 | 6 | 39 | 0.15 | 4400 |
| 18 | 0.57~0.72 | −0.20~−0.14 | 0.16~0.31 | −0.11~−0.03 | 0.25~0.45 | −0.48~−0.33 | 0.76 | 11 | 53 | 0.19 | 4600 |
| 19 | 0.82~0.95 | −0.34~−0.27 | 0.56~0.68 | −0.05~−0.15 | 0.89~1.26 | −1.28~−1.51 | 1.18 | 13 | 72 | 0.26 | 4100 |
| 20 | 0.53~0.57 | −0.10~−0.10 | 0.01~0.05 | −0.49~−0.28 | 0.06~0.09 | −0.77~−0.51 | 0.09 | 0 | 17 | 0.18 | 4000 |

8. The cutting tool of claim 7, wherein the maximum height of the roughness profile Rz(B) of the region B is in a range between 0.1 μm and 0.5 μm.

9. The cutting tool of claim 5, wherein a maximum height of the roughness profile Rz(A') of an interface between the base and the layer in the region A is in a range between 0.3 μm and 1.5 μm and there are four to fifteen convex portions in the interface of a reference length of 5 μm, each of the convex portions being defined as a portion protruding above a reference line that goes through a midpoint between a highest location and a lowest location in the interface of the reference length of 5 μm.

10. The cutting tool of claim 5, wherein a contact angle θ of water on the rake face is in a range between 30 degrees and 80 degrees.

11. The cutting tool of claim 5, further comprising a breaker groove located on an inner side of the region A and a region C that is a bottom portion of the breaker groove, wherein a maximum height of the roughness profile Rz(C) of the region C is in a range between 0.1 μm and 1.5 μm and a skewness Rsk(C) of the region C is negative and smaller than the skewness Rsk(A) of the region A.

12. The cutting tool of claim 11, wherein the skewness Rsk(C) of the region C is in a range between −1.0 and −0.4.

13. The cutting tool of claim 11, wherein the maximum height of the roughness profile Rz(C) of the region C is in a range between 0.5 μm and 1.5 μm.

14. The cutting tool of claim 11, wherein the maximum height of the roughness profile Rz(A) of the region A is smaller than the maximum height of the roughness profile Rz(C) of the region C.

15. The cutting tool of claim 11, wherein a maximum height of the roughness profile Rz(A') of an interface between the base and the layer in the region A is in a range between 0.3 μm and 1.5 μm and there are four to fifteen convex portions in the interface of a reference length of 5 μm, each of the convex portions being defined as a portion protruding above a reference line that goes through a midpoint between a highest location and a lowest location in the interface of the reference length of 5 μm.

16. The cutting tool of claim 11, wherein a contact angle θ of water on the rake face is in a range between 30 degrees and 80 degrees.

17. The cutting tool of claim 1, further comprising a breaker groove located on an inner side of the region A and a region C that is a bottom portion of the breaker groove, wherein a maximum height of the roughness profile Rz(C) of the region C is in a range between 0.1 μm and 1.5 μm and a skewness Rsk(C) of the region C is negative and smaller than the skewness Rsk(A) of the region A.

18. A method of cutting a workpiece using the cutting tool of claim 1, comprising:
bringing the cutting edge close to the workpiece while at least one of the cutting tool and the workpiece is rotated;
bringing the cutting edge of the cutting tool into contact with a surface of the workpiece to cut the workpiece; and
separating the cutting tool from the workpiece.

19. A method of cutting a workpiece using the cutting tool of claim 5, comprising:
bringing the cutting edge close to the workpiece while at least one of the cutting tool and the workpiece is rotated;
bringing the cutting edge of the cutting tool into contact with a surface of the workpiece to cut the workpiece; and
separating the cutting tool from the workpiece.

20. A method of cutting a workpiece using the cutting tool of claim 11, comprising:
bringing the cutting edge close to the workpiece while at least one of the cutting tool and the workpiece is rotated;
bringing the cutting edge of the cutting tool into contact with a surface of the workpiece to cut the workpiece; and
separating the cutting tool from the workpiece.

* * * * *